Nov. 14, 1944.  S. D. RUSSELL  2,362,861
BALER
Filed April 19, 1941   8 Sheets-Sheet 1
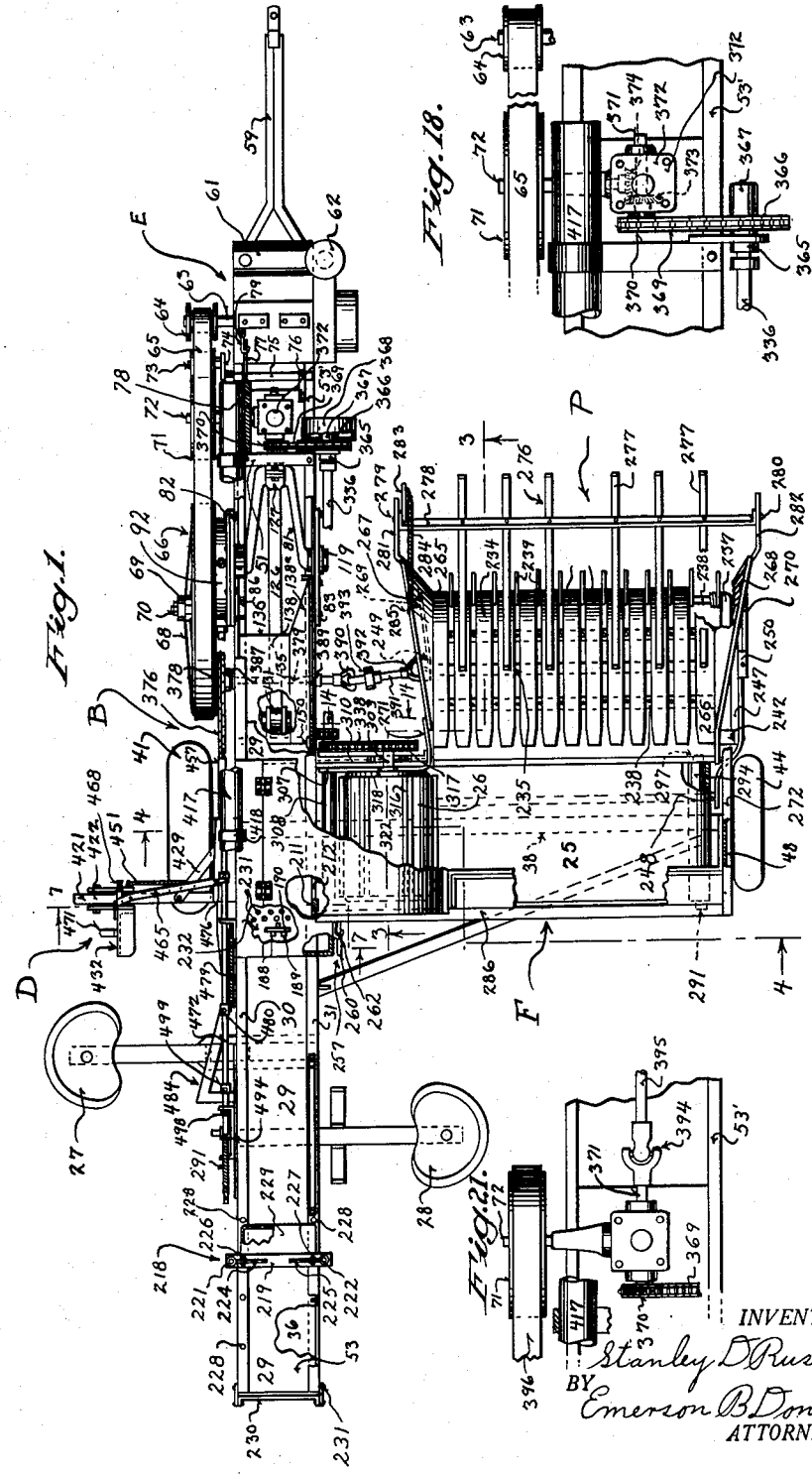
INVENTOR.
Stanley D. Russell
BY Emerson B. Donnell
ATTORNEY

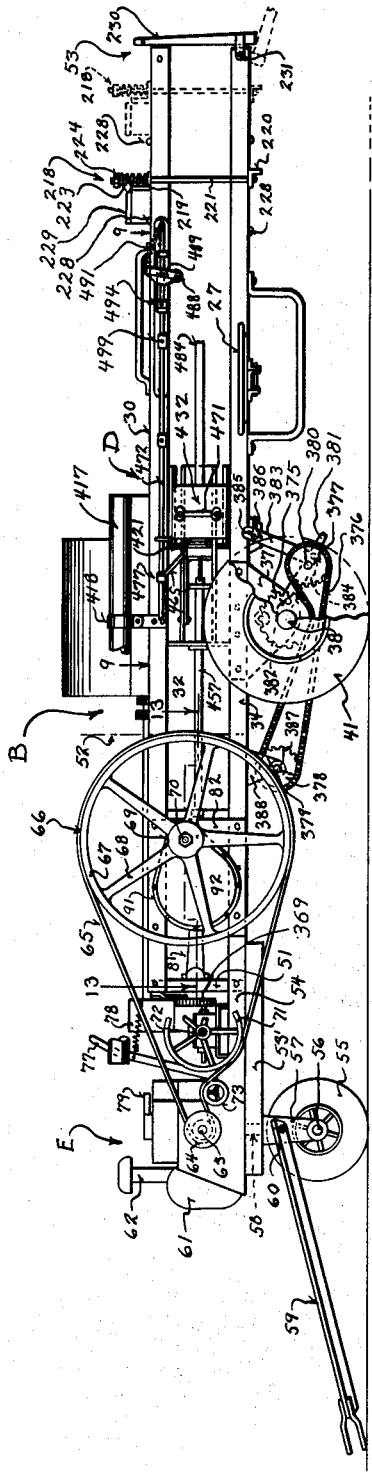
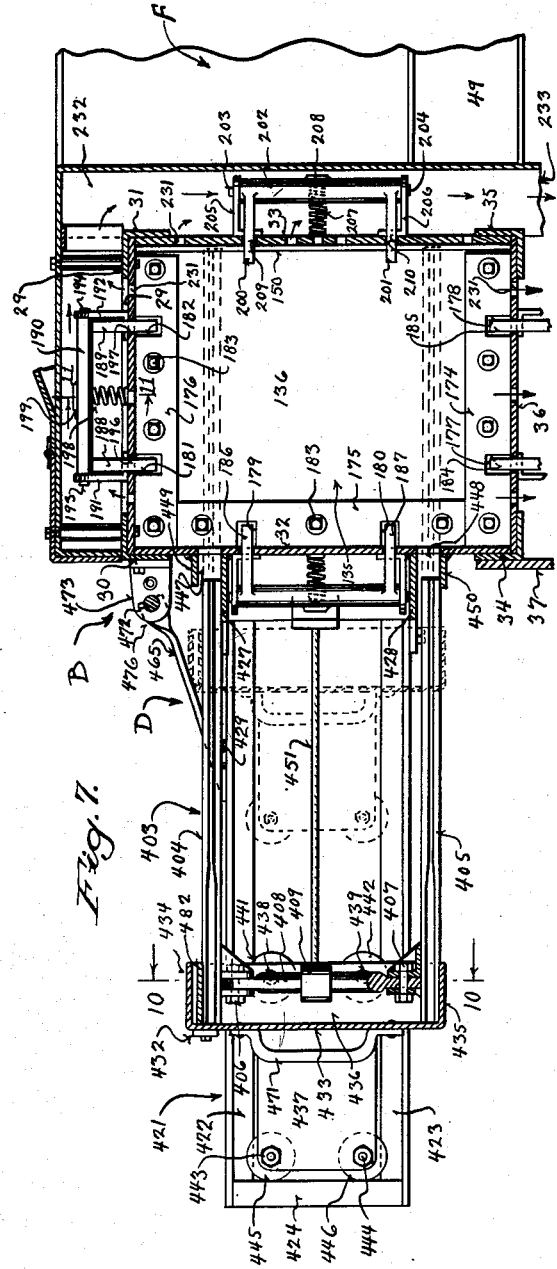

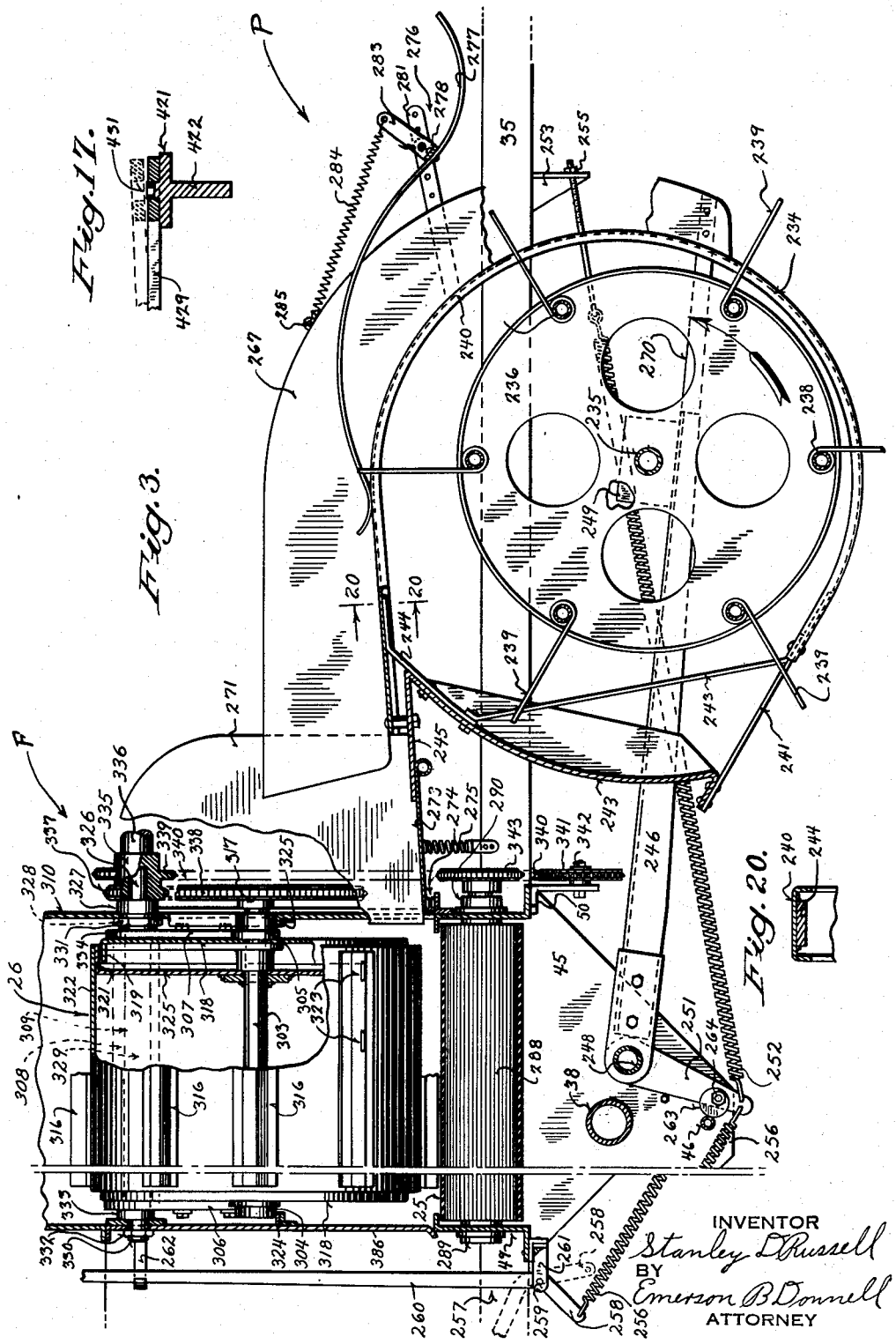

Nov. 14, 1944.  S. D. RUSSELL  2,362,861
BALER
Filed April 19, 1941  8 Sheets—Sheet 4
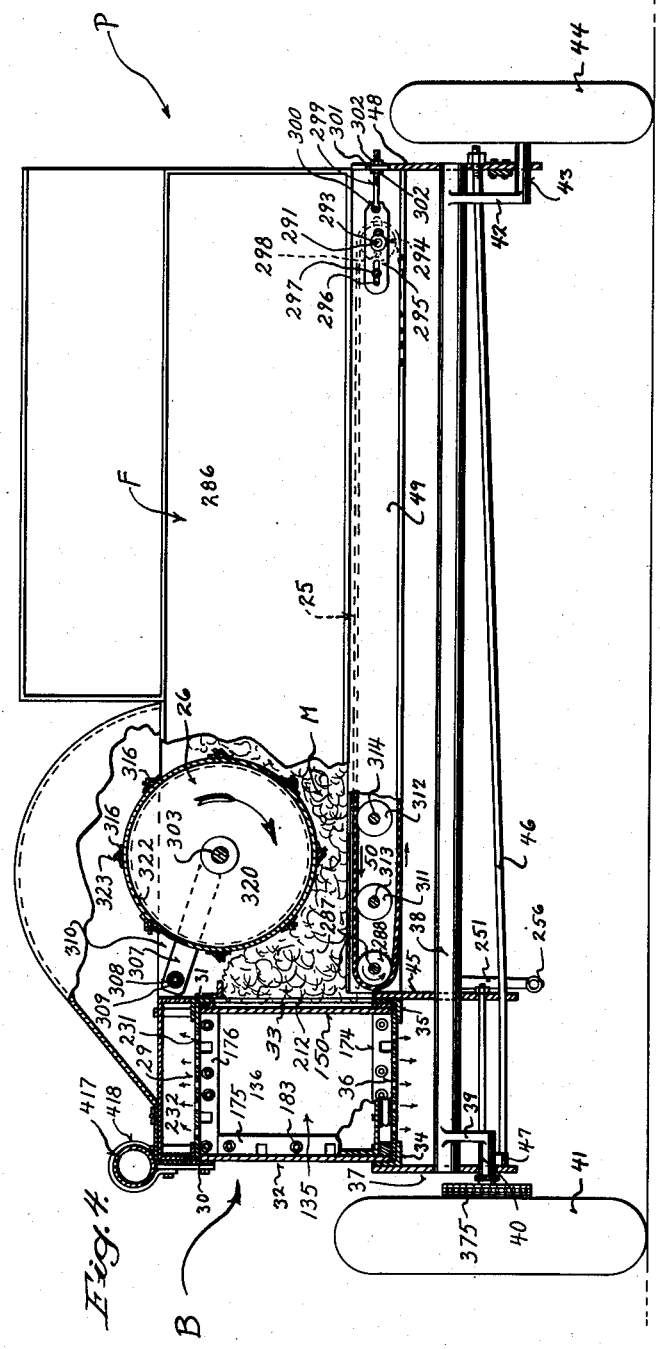
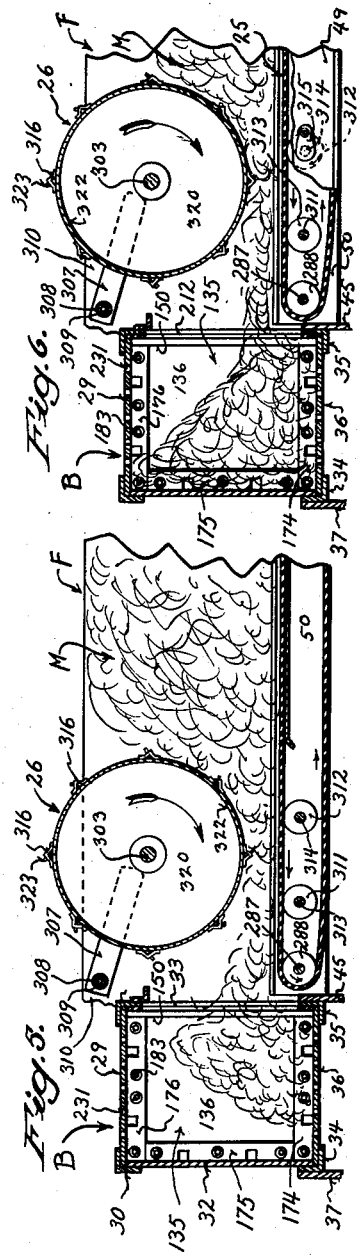
INVENTOR
Stanley D Russell
BY
Emerson B Donnell
ATTORNEY

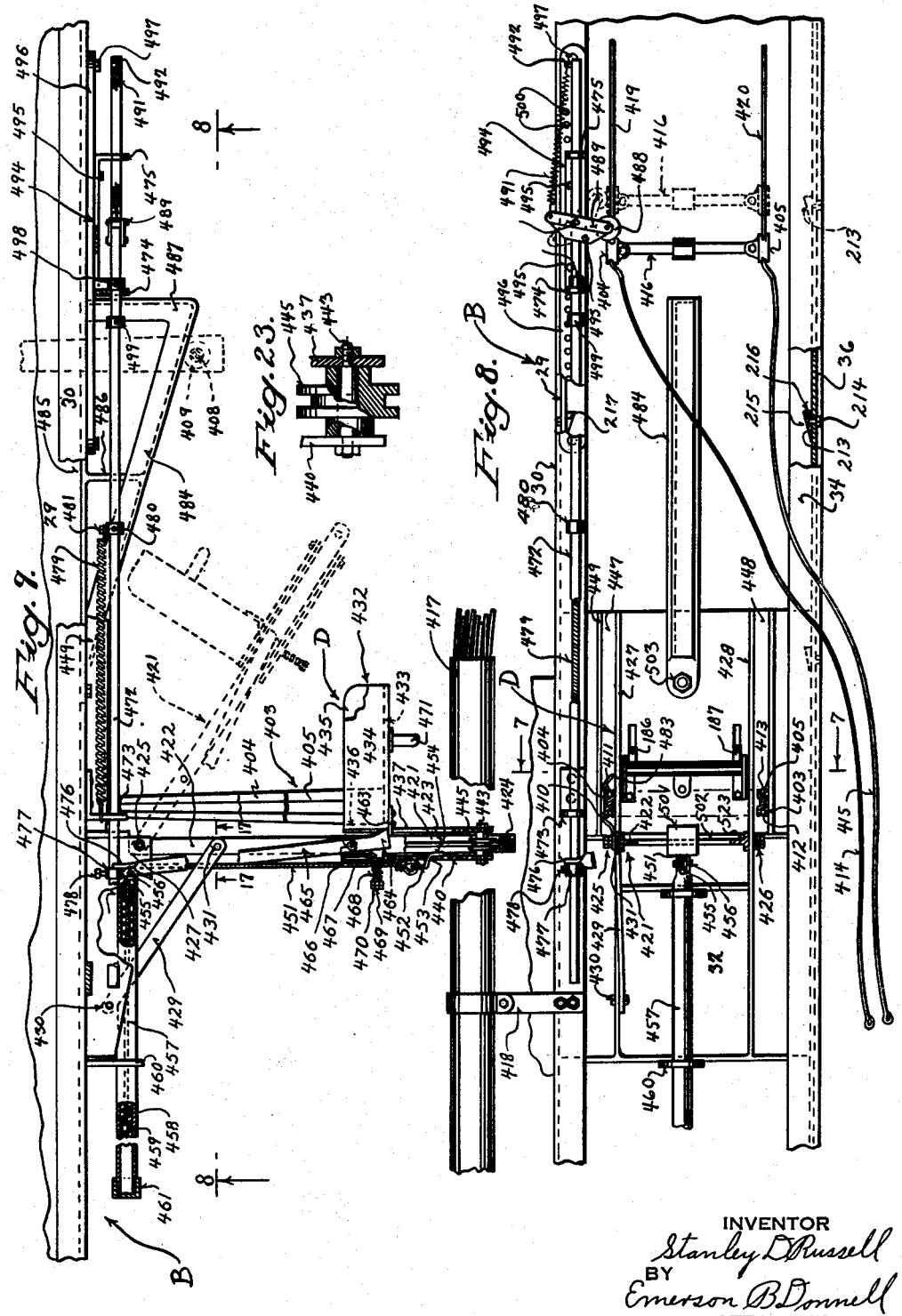

Nov. 14, 1944.　　　S. D. RUSSELL　　　2,362,861
BALER
Filed April 19, 1941　　　8 Sheets-Sheet 6
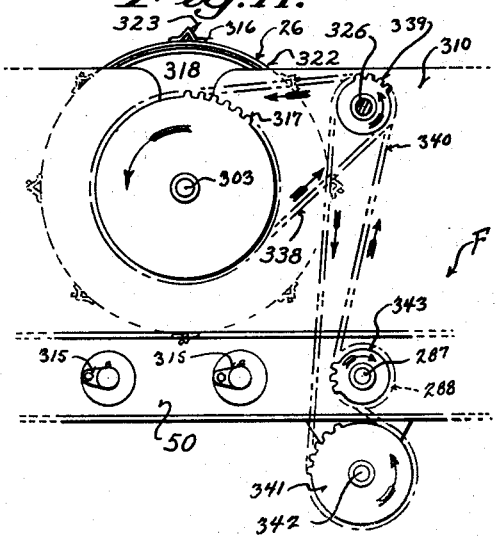
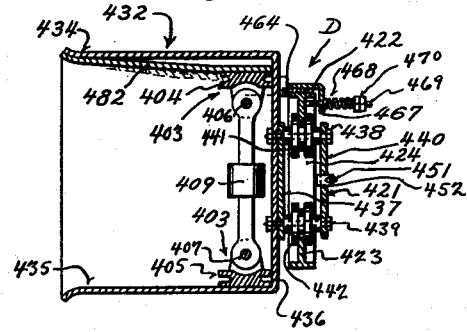
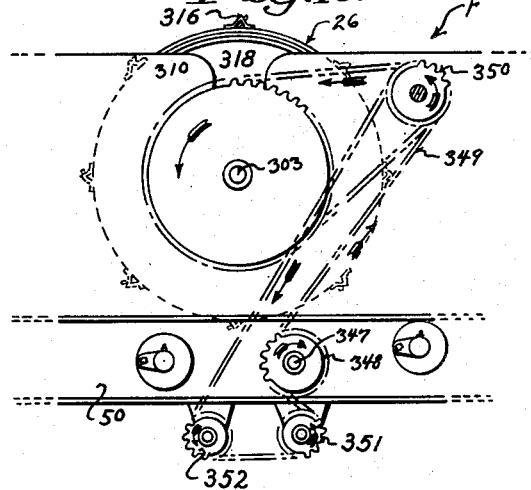
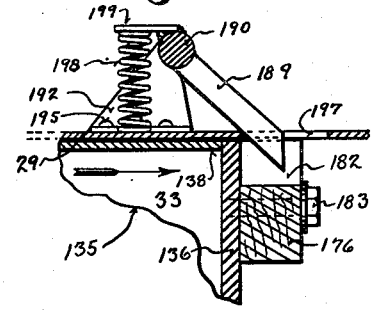
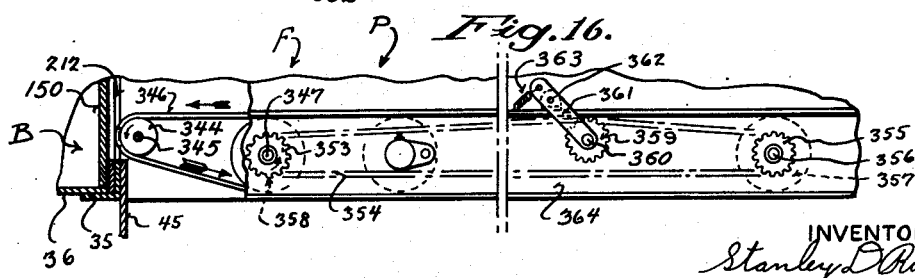
INVENTOR
Stanley D. Russell
BY
Emerson B. Donnell
ATTORNEY

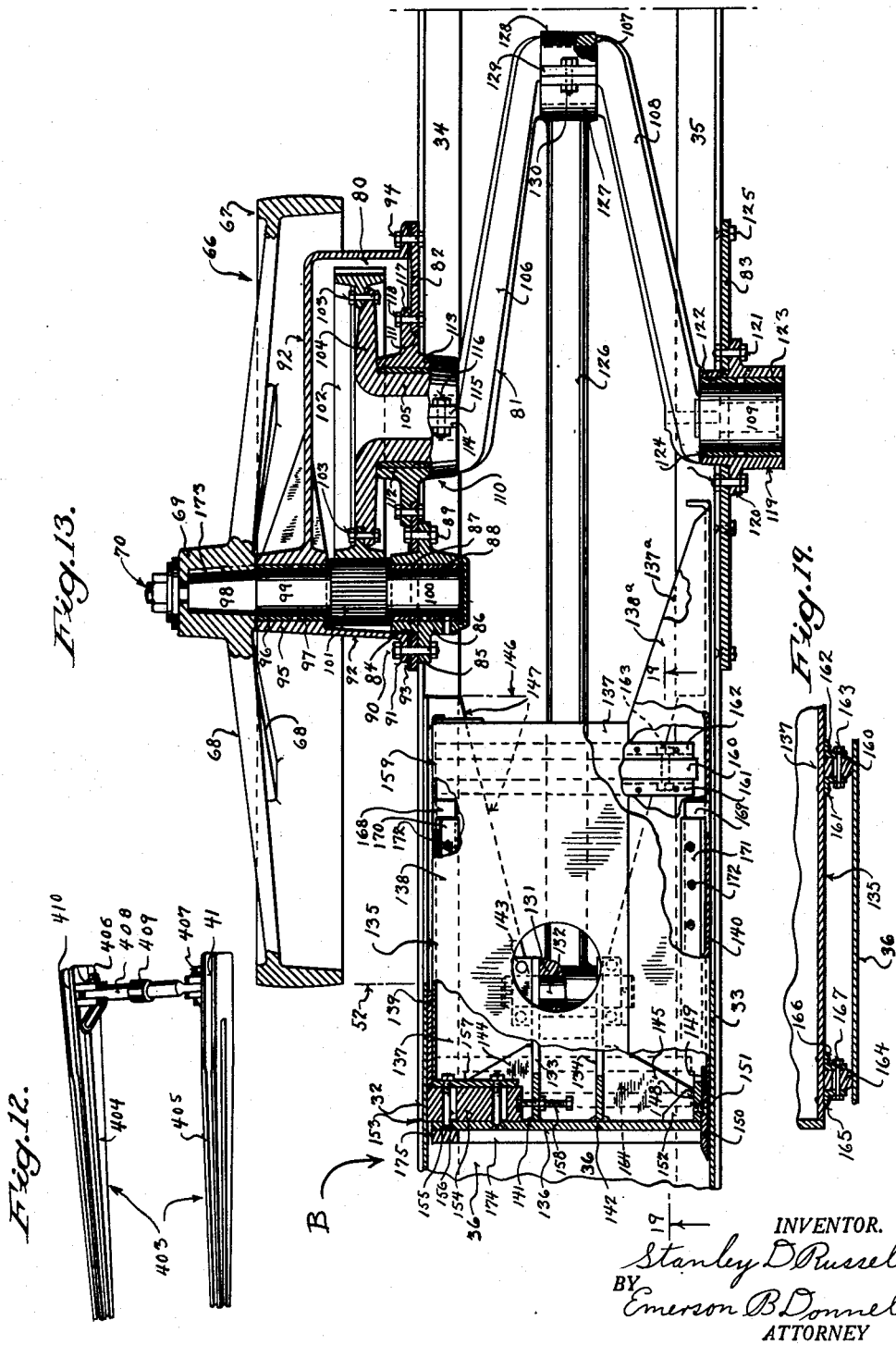

Nov. 14, 1944.　　　　S. D. RUSSELL　　　　2,362,861
BALER
Filed April 19, 1941　　　　8 Sheets-Sheet 8
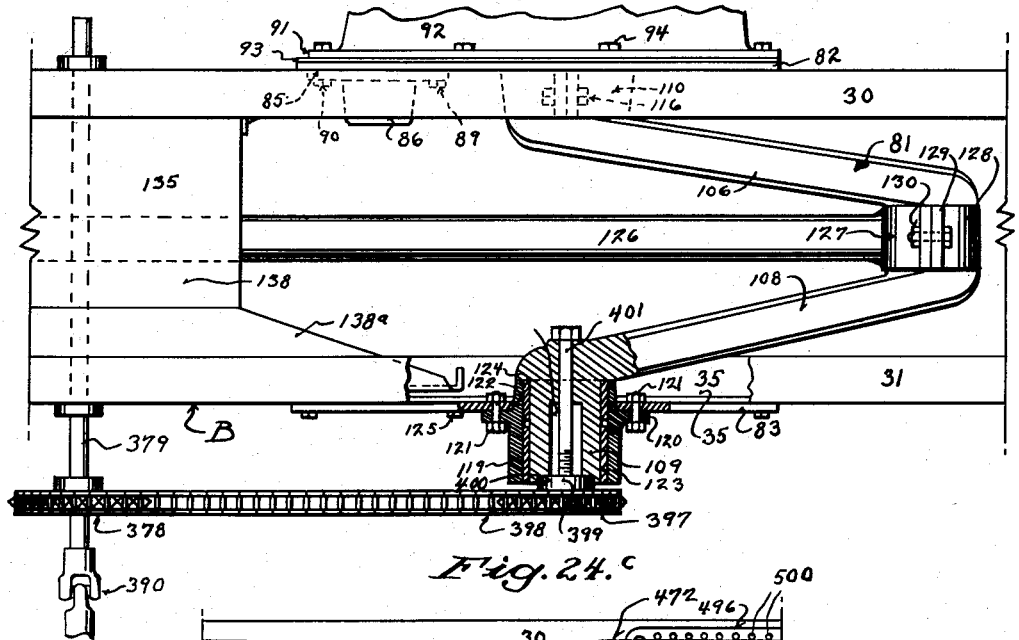
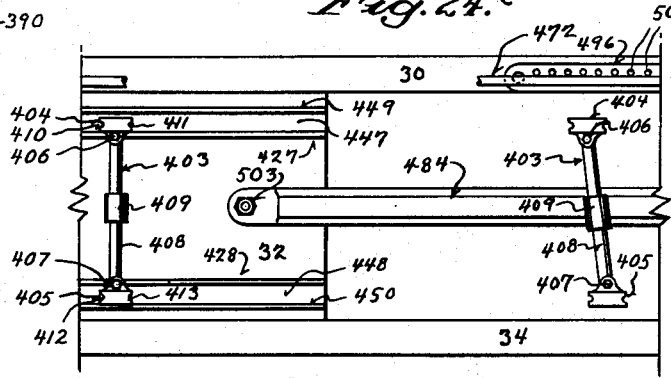
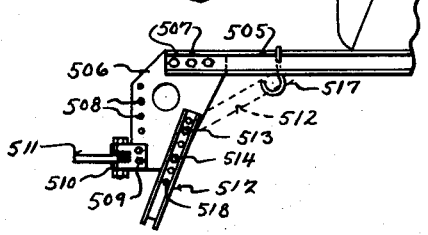
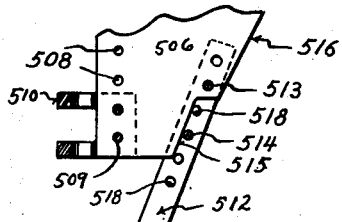
INVENTOR
Stanley D. Russell
BY
Emerson B. Donnell
ATTORNEY Patented Nov. 14, 1944

2,362,861

UNITED STATES PATENT OFFICE 2,362,861

BALER

Stanley D. Russell, Racine, Wis., assignor to J. I. Case Company, Racine, Wis., a corporation Application April 19, 1941, Serial No. 389,396

20 Claims. (Cl. 100—20)

The present invention relates to balers and an object thereof is to generally improve the construction and operation of machines of this class.

A further object is to provide such a machine of larger capacity, lighter weight and lower cost than similar machines of comparable dimensions heretofore known.

A further object is to provide improvements in methods and apparatus for feeding a baler.

A further object is to provide a new method and apparatus for separating the bales in a baler whereby to eliminate the hazard and waste involved in the use of blocks for separating the bales.

Further objects are to provide a new, novel and improved slotter, finger or guiding means for separating bales; holding means for the slotter; such means adapted to insert the slotter at predetermined times; and trip means for automatically determining the length of the bales.

Further objects will be apparent from the following description and accompanying drawings in which:

Figure 1 is a plan view of an illustrative machine embodying the invention.

Fig. 2 is a left side elevation of the same machine.

Fig. 3 is a vertical sectional view on the line 3—3 of Fig. 1, showing the pick-up means.

Fig. 4 is a vertical sectional view on the line 4—4 of Fig. 1.

Figs. 5 and 6 are similar views of a portion of Fig. 4 showing different stages in the operation of the mechanism.

Fig. 7 is a transverse sectional view on the line 7—7 of Figs. 1 and 8.

Fig. 8 is a vertical sectional view on the line 8—8 of Fig. 9.

Fig. 9 is a plan view with parts broken away taken on the line 9—9 of Fig. 2.

Fig. 10 is a vertical sectional view taken on the line 10—10 of Fig. 7.

Fig. 11 is a horizontal sectional view on the line 11—11 of Fig. 7.

Fig. 12 is a view in perspective of certain mechanism indicated in Figs. 7 to 10 inclusive.

Fig. 13 is a plan view partly in section on the line 13—13 of Fig. 2.

Fig. 14 is a vertical sectional view on the line 14—14 of Fig. 1.

Fig. 15 is a similar view of a modified arrangement of driving mechanism.

Fig. 16 is a view of a portion of Fig. 4 showing a modified arrangement of driving mechanism used with construction such as that shown in Fig. 15.

Fig. 17 is a vertical sectional detail taken on the line 17—17 of Fig. 9.

Fig. 18 is an enlarged plan view of a portion of Fig. 1.

Fig. 19 is a vertical sectional view taken on the line 19—19 of Fig. 13.

Fig. 20 is a vertical sectional view taken on the line 20—20 of Fig. 3.

Fig. 21 is a view similar to Fig. 18, showing a modified driving mechanism.

Fig. 22 is a plan view of a portion of Fig. 1 enlarged and with parts broken away showing a modified pick-up driving arrangement.

Fig. 23 is an enlarged detail of certain construction indicated in Fig. 9, with parts broken away.

Fig. 24 is a view of a portion of Fig. 2 showing a modified front end supporting means.

Fig. 24$^a$ is a plan view of certain construction shown in Fig. 24.

Fig. 24$^b$ is a vertical axial sectional view of construction indicated in Fig. 24$^a$, on the line 24$^b$—24$^b$ of Fig. 24$^a$.

Fig. 24$^c$ is a view of a portion of Fig. 8, illustrating certain operative characteristics.

Similar reference characters have been applied to the same parts throughout these drawings and the specification.

As seen in Fig. 1, the illustrative machine includes a baler, generally designated as B, a pick-up generally designated as P, feeding means F, and bale dividing means D, the mechanism being driven, if desired, by an engine E. Pick-up P operates to elevate material from the ground onto an apron 25.

Apron 25 conveys the material toward baler B and beneath a rotating drum, roller, or feeder 26. Apron 25 and feeder 26 urge the material into the baling chamber, as will appear, through an opening in the side thereof, dividing means D operating periodically to provide a pathway for a wire or other binding means and without interruption of the feeding by apron 25 and drum 26. In the present instance, the wires or other binding means are applied by operators occupying seats 27 and 28.

No separating blocks are necessary and since divider D functions without interrupting the feed, the baling process is continuous and the time ordinarily lost by so stopping the feed to permit dropping of the block is saved in the present machine. Furthermore, since divider D is inserted in the present instance automatically, as will appear, the possibility of accidents to the machinery is eliminated and times losses through this source are avoided. Also, for this reason, the baling mechanism may be run appreciably faster than has been common heretofore. The total gains in capacity over prior balers of comparable size is appreciable, in fact on the order of twenty-five percent.

Returning to a more detailed description of the machine, as seen in Figs. 1, 2 and 7, the main body of the baler comprises a baling chamber made up in any suitable or well-known manner, as for example, a top plate 29 connected as by angle irons 30 and 31 with side plates 32 and 33, plates 32 and 33 being connected as by angle irons 34 and 35 with a bottom plate 36. These members make up a box-like structure constituting the baling chamber or compression chamber of the baler. Angle iron 34 is supported as seen in Figs. 2, 4 and 7 by means of a bracket 37 fixed therewith and engaging an axle or brace 38 extending transversely beneath bale chamber B and feeder F. Axle 38 has a downwardly extending bracket 39 carried by a stub axle 40 which is in turn supported by a ground engaging wheel 41.

Axle or brace 38 adjacent its other end has a bracket 42 carried by a stub axle 43 which is in turn supported by a ground engaging wheel 44 which is thus positioned at the far side of the pick-up unit from baling chamber B. A bracket 45 which may be somewhat similar to above mentioned bracket 37 extends downwardly from angle iron 35 and is supported on axle 38. Bracket 45 may be made to extend substantially below axle 38 and a truss 46 may extend between a boss 47 on stub axle 40 or any other suitable structure in the vicinity through bracket 45 and also through a bracket 48 engaging axle 38 in the vicinity of bracket 42. Bracket 48 supports Z bars 49 and 50, Fig. 3, constituting a frame structure for feeding mechanism F, Z bars 49 and 50 extending substantially between brackets 48 and 45 to be supported thereon.

Returning to baling chamber B, as seen in Fig. 7, angle irons 30, 31, 34 and 35 extend the full length of the baling chamber and beyond to form the major portion of the machine, in the present instance being united by a frame, bulkhead or the like 51, Fig. 2, at the front of the baling chamber, plates 29 and 36 extending approximately from the line 52 rearwardly to the outlet end 53 of bale chamber B. Plates 32 and 33 extend from approximately the region of line 52, a short distance only, as will appear.

In the neighborhood of bulkhead 51 an extension or platform generally designated as 53' is fixed with baling chamber B in any suitable manner, a reinforcement 54 being provided, if desired. Platform 53', accordingly becomes a part of the main frame of the machine and in the present instance is supported by a ground engaging wheel 55, having an axle 56, and supporting the platform through a fork or similar member 57. Fork 57 may have a shank or king pin 58 journaled in suitable or well-known manner in platform 53', and a drawbar 59 may be bifurcated or otherwise suitably arranged to be pivotally connected as at 60 with fork 57.

The structure so far described comprises a unitary 3-wheeled vehicle which can be readily trailed behind a tractor or other pulling means either for transportation or for working in the field.

The baling mechanism proper is carried on or associated with baling chamber or body portion B. Thus, platform 53', as seen in Figs. 1 and 2, may carry an engine generally designated as E, above noted, and having a fuel tank 61 and an air intake pipe 62, a crank or driving shaft 63 and a driving pulley 64. The details of engines generally being well-known and forming no part of the present invention, the engine need not be further described.

Pulley 64 drives, through a belt or other flexible motion transmitting means 65, a fly wheel generally designated as 66 and having a rim portion 67, spokes or arms 68 and a hub 69. Fly wheel 66 is fixed on a shaft 70 through which it drives the baling plunger as will appear. Belt 65, as well as engaging pulley 64 and fly wheel 66 also engages an idler pulley 71 fixed on a countershaft 72, the belt being maintained in contact with idler 71 as by a belt tightening idler 73, suitably supported as by an arm 74 fixed on a shaft 75. Shaft 75 is supported in suitable bearings, as 76, fixed with reinforcing member 54, or otherwise supported, and has a lever 77 urged rearwardly as by a spring 78 for rotating shaft 75 in a clockwise direction as seen in Fig. 2, for yieldably raising idler 73 into contact with belt 65. When it is desired to temporarily disconnect the mechanism from engine E, lever 77 may be pulled toward engine E which will lower idler 73 and loosen belt 65. A hook, or other suitable fastening means 79 may be provided for holding lever 77 in this position.

Shaft 70, as seen in Fig. 13, constitutes the main input shaft of a novel reduction gear generally designated as 80 for driving a crank shaft generally designated as 81, at the required relatively slow speed. A plate 82 is suitably fixed with angle irons 30 and 34 for supporting shafts 70 and 81 and a plate 83 is suitably fixed with angle irons 31 and 35 for further supporting crank shaft 81, these plates supporting the parts against the very considerable stresses developed by the baling operation. Plate 82 has an aperture 84 in which is secured as by a flange 85, a bearing 86 which may be fitted with bushings 87 and 88 or other suitable friction reducing elements. Bearing 86 is secured in place by one or more bolts as 89 and 90, bolt 90 engaging a flange portion 91 of a housing 92 which abuts plate 82, a gasket 93 being interposed if desired. Other bolts as 94 serve to maintain the housing solidly in place. Housing 92 includes a boss or bearing portion 95 provided with bushings 96 and 97 or other suitable friction reducing means.

Above mentioned shaft 70 is journaled in bushings 96, 97, 87 and 88 and accordingly well supported for rotation in housing 92.

Shaft 70 includes a portion 98 which may be tapered or otherwise adapted for reception of fly wheel hub 69, and journal portions 99 and 100 for support in the respective bearings, journals 99 and 100 being spaced by a gear or pinion 101. Pinion 101, in the present instance meshes with and drives a ring gear 102 within housing 92, gear 102 being fixed as by bolts 103—103 with a flange or adapter 104 forming part of above mentioned crank shaft 81. Crank shaft 81 includes said flange or adapter 104, a journal portion 105, a crank arm 106, a crank pin portion 107, a crank arm 108 and a journal portion 109. Journal portion 105 is carried in a bearing generally designated as 110 and fixed in an aperture 111 in plate 82. However, in order to be able to assemble the parts, bearing 110 comprises separable sections 112 and 113 joined as by flanges 114 and 115, united by suitable bolts or the like as 116. Portions 112 and 113 are provided with flanges as 117 fixed with plate 82 as by bolts 118.

With the structure described, it is possible with housing 92 removed from plate 82, to pass journal portion 109, arm 108, pin 107, arm 106 and bearing 110 through aperture 111 into place in plate 82, after which housing 92 may be applied and shaft 70 and bearing 86 assembled with the housing. These associated parts constitute a reduction gear which may operate in a bath of oil retained by housing 92, the housing also serving to exclude dirt or other deleterious material from the gear. Incidentally, ring gear 102 may be chosen from production items manufactured in quantity for other purposes, such for example as tractor main drive gears, this resulting in the availability for a relatively inexpensive machine, such as a baler, of a very high quality gear. Pinion 101 may be readily and inexpensively cut on shaft 70 by well-known methods.

In view of this construction, it will be evident that a crank can be used having a throw considerably in excess of the diameter of gear 102 which is not the case in conventional construction wherein two large gears connected by a pin constitute the crank. As a result, the necessary long stroke is obtained with much smaller and lighter construction than has heretofore been known. Also, by virtue of this construction, the gearing may be readily enclosed in an oil tight casing.

Journal 109 in the present instance is supported in a bearing 119 secured to plate 83 as by a flange 120 and bolts 121. Bearing 119 may be arranged to extend through an aperture 122 in plate 83 and may have bushings 123 and 124 or other suitable friction reducing elements. Plate 83 is secured to angle irons 35 and 31, in any suitable manner as by bolts 125.

Crank pin portion 107 carries and actuates a pitman 126 having a bearing portion 127 in the present instance fitted with a cap 128 maintained against the bearing as by a flange 129 secured as by bolts 130. Pitman 126, at its opposite end, has a bearing 131 engaged with a wrist pin 132 carried in brackets 133 and 134 fixed with or constituting part of a baler plunger generally designated as 135. Rotation of crank 81 accordingly will cause reciprocating motion of plunger 135 as will be apparent.

Plunger 135 comprises a box like element including a head or end wall 136, a bottom wall 137, top wall 138, a back wall 139 and a front wall 140. Brackets 133 and 134 may be fastened as by welding at 141 and 142 within wall 136 and may have split clamps as 143 suitably fastened thereto for a purpose to appear. Reinforcing plates 144 and 145 in the present instance are interposed between brackets 133 and 134 and end wall 136. The very considerable force developed by pitman 126 is accordingly transmitted directly to end wall 136 in the best possible manner.

Lower plate 36 of baling chamber B extends forwardly to a point 146 but is notched as at 147 to provide clearance for pitman 126.

At the juncture between end wall 136 of plunger 135 and front wall 140, reinforcing bars or plates 148 and 149 may be interposed and fastened in any suitable manner, and a knife or cutting means 150 may be mounted on the plunger at this point and retained as by screws 151. Reinforcing bars 148 and 149 may be arranged to support the plunger against distortion by the reaction against knife 150. Other reinforcing elements or plates as 152 may also be interposed.

To hold plunger 135 in proper relation to baling chamber B, front wall 140 and rear wall 139 are of substantial length, but front wall 140 extends forwardly of plunger 135 substantially further than rear wall 139 for covering the feed opening as will appear. Wall 140 is reinforced by an extension 138ᵃ of upper wall 138, a similar extension 137ᵃ of bottom wall 137 also serving to support wall 140.

Wall 140 is held in suitable sliding relation to angle irons 135 and 131 by suitable pressure exerting guiding means generally designated as 153 and which in the present instance for convenience comprises blocks 154 of suitable material such as oil impregnated wood. In the present instance, block 154 is held in contact with end wall 136 as by bolts 155 traversing slotted openings 156 and engaging a plate 157 through which block 154 is clamped in engagement with end wall 136. Block 154 is urged as by a screw 158, threaded for convenience in bracket 133, through a suitable opening in back wall 139 into contact with plate 32, the reaction of block 154 maintaining wall 140 in position relative to plate 33 and also maintaining knife 150 in proper relation to its companion abutment means to be later disclosed. A similar guiding means 159 may be provided adjacent the front end of plunger 135. In each instance the block is preferably arranged with the end grain in contact with the guiding surface.

Similar expedients are utilized for supporting the plunger for sliding movement, as seen in Figs. 13 and 19. Thus bottom wall 137 has a slide block 160 in the present instance clamped between angle irons 161 and 162, as by a bolt 163. Slide block 160 may be made of oil impregnated wood or other suitable material so that it will be self lubricating and carry the weight of plunger 135 without attention. A similar slide block 164 is located beneath plunger 135 adjacent end wall 136 and may be clamped between angle irons 165 and 166 as by bolts 167. For guiding the plunger in its movement, similar slide blocks 168 and 169 are disposed along the lower side walls 139 and 140, being carried respectively in channel or like members 170 and 171, the blocks projecting through suitable openings in the side walls and being retained in channel members 170 and 171 as by bolts 172—172. Blocks 168 and 169 guide the plunger in a general way against oscillatory movement during its reciprocation in baling chamber B, while close adjustment of the path of travel may be effected by adjusting blocks 154 and 159. A structure is thus provided which can develop and withstand very substantial pressures, but a safety expedient may be provided in the event that plunger 135 encounters a solid object of any kind in that portion 98 of shaft 70 is provided with a key 173 through which it is driven by hub 169 of fly wheel 66. In the present instance key 173 is made of a soft material, such for example, as an aluminum alloy, the proportions being so chosen that the key will shear if anything obstructs the progress of plunger 135 and the loads build up beyond a predetermined maximum. It is a simple matter to renew the soft metal key and continue operation after the obstruction is removed.

Plunger 135 is provided with strips 174, 175 and 176, Fig. 7, of wood or other suitable material, for contacting the baled material at the margins of end wall 136, strip 174 being provided with notches 177 and 178, strip 175 being provided with notches 179 and 180, and strip 176 being provided with notches 181 and 182. The strips are fastened to end wall 136 in any suitable manner as by bolts or the like 183—183.

Slots 177 to 182 inclusive, are provided for the purpose of clearing retainer dogs 184 to 189, respectively, dogs 188 and 189 being typical, and their mounting only will be described. As seen in Fig. 11, said dogs are fixed with a supporting element 190 pivotally supported by brackets 191 and 192 carried on plate 29, member 190 providing trunnions 193 and 194 journaled in brackets 191 and 192 or being similarly supported from said brackets. Brackets 191 and 192 are suitably supported from plate 29 as by rivets or other suitable means 195. Dogs 188 and 189 extend inwardly and rearwardly into baling chamber B through slots 196 and 197 to engage the material being baled and prevent return movement upon retraction of the plunger. Supporting member 190 is urged in a clockwise direction as seen in Fig. 11, as by a spring 198, in the present instance compressed between plate 29 and an arm 199 extended forwardly from member 190. Supporting member 190 and dogs 188 and 189 may therefore be rotated in a counterclockwise direction by pressure of the advancing material on dogs 188 and 189 so as to move said dogs slightly out of the baling chamber through slots 196 and 197, thus providing for uninterrupted movement of the bale being formed. However, upon retraction of plunger 135, spring 198 will rotate member 190 and dogs 188 and 189 in a clockwise direction to introduce the dogs into the bale and prevent backward motion of the material of the bale.

In the advancing motion of plunger 135, end plate 136 continues to a point adjacent slots 196 and 197 but not far enough to interfere with dogs 188 and 189. Block 176, however, is of sufficient thickness to pass beyond dogs 188 and 189 so as to press upon the material being baled at a point beyond the dogs, the block clearing the dogs by virtue of slots 181 and 182. In this way the material is positively compressed beyond the dogs as clearly apparent from Fig. 11. It will be understood that identically similar operation is effected by blocks 175 and 174.

As above noted, front wall 140 of plunger 136 is provided with a knife 150. Plate 33 of baling chamber B is also provided with dogs 200 and 201 carried on a supporting element 202 journaled as by trunnions 203 and 204 in brackets 205 and 206, suitably supported on plate 33. A spring 207 compressed between plate 33 and an arm 208 urges dogs 200 and 201 into baling chamber B as before, through slots 209 and 210. Because of knife 150, no block, such as 176, is provided on this edge of plunger 135, and the assembly including dogs 200 and 201 is located sufficiently to the rear of dogs 186 and 187 so as not to be contacted by knife 150.

Plate 33, as seen in Fig. 1, has an abutment or slice bar 211 defining the forward margin of an opening 212, through which material to be baled is introduced and knife 150 in the rearward passage of plunger 136 passes somewhat to the rear of bar 211 so as to positively cut off the stream of material which has been passing into bale chamber B from feeding mechanism F. Within the contemplation of the invention, bar 211 and knife 150 may be cooperating shear blades but it is also contemplated that knife 150 may be proportioned to cut through the stream of material by a cutting or chopping action independent of any cooperating shear blade, bar 211 being merely a support or abutment to prevent the material immediately in front of knife 150 from retreating under the pressure of the knife. Under these conditions, it is not necessary that knife 150 contact bar 211 nor that bar 211 be sharpened to provide a cutting edge. A clearance may accordingly be provided between knife 150 and bar 211, plunger 136 being guided by blocks 154, 159, 168 and 169 with sufficient accuracy to maintain this clearance. In the illustrative embodiment, this clearance is on the order of $\frac{1}{16}$ of an inch. Good reliability is thus provided and critical adjustments avoided. Also this arrangement cuts the considerable volume of material being introduced through opening 212 with moderate power consumption only.

Expansion of baled material to follow the retracting plunger may be further avoided by cleat members as 213—213, Fig. 8, retained for example on plate 36 by bolts or the like 214. Cleats 213 may be provided with a sloping face 215 presented toward the advancing material and a substantially vertical face 216 presented to the material tending to expand and follow the retreating plunger. One or more of these cleats may be provided as desired.

Similar cleats as 217 may be provided on plate 29.

Plates 29 and 36, together with angle irons 30, 31, 34 and 35 may be sprung toward each other at the rear as by a compressor generally designated as 218, Figs. 1 and 2. This may be of any suitable or well-known type in the present instance including an upper angle iron 219 and a lower angle iron 220, extending transversely of plates 29 and 36 and projecting beyond the margins thereon. Angle irons 219 and 220 may be united by tension rods 221 and 222 having springs as 223 compressed between one of the angle irons and suitable abutments as hand nuts 224 and 225. Nuts 224 and 225 may be tightened to develop the desired amount of compressing force on the rear end of the bale chamber. Under some conditions it is desirable to compress the bale chamber at the extreme end while under other conditions such compression is desirable at a point spaced from the end and nearer the actual compressing operation. Compressor 218 is therefore arranged to be movable and in the present instance angle iron 219 is provided with openings as 226 and 227 engageable with suitable detent means on the bale chamber, such for example as rivets 228—228, which in the present instance are present for another purpose, namely as part of the baling chamber. By loosening nuts 224 and 225 sufficiently, compressor 218 may be easily shifted to a new position and the nuts again tightened, rivets 228 serving, if necessary, to prevent displacement of the compressor. A tool box 229, in the present instance, although not necessarily, is attached to angle iron 219. Similar openings may be provided in angle iron 220 for the same purpose.

A chamber extension 230 may be hinged in any suitable manner as at 231 for guiding finished bales to the ground in well-known manner.

In view of the relatively rapid action of the plunger and also the lack of a large opening in the top of the bale chamber, such as is common in balers heretofore known, an appreciable quantity of air may be trapped in the bale chamber by action of the plunger, resulting in excessive blowing of dust out of the bale chamber and also in some interference with baling and needless consumption of power. For this reason, plates 29, 33 and 36 are perforated as seen in Figs. 7 and 1 with numerous openings 231 which will relieve any air pressure without permitting escape of baled material. A passageway or flue 232, Fig. 7, is provided, enclosing openings 231 and leading downwardly below the baler as at 233. The puff of air with any contained dust resulting from the compressing stroke of the plunger is accordingly discharged harmlessly on the ground below the baler.

This completes the description of the baling mechanism proper.

Material to be baled is gathered by pick-up P, as above pointed out.

The pick-up includes a cylinder generally designated as 234, Fig. 3, comprising a shaft 235, a plurality of heads as 236 and 237, and a series of elements 238—238, in the present instance tubular in form, connecting the spaced heads. Elements 238—238 in the present instance may be rigidly attached to heads 236 and 237 in any suitable or well-known manner and are provided with pick-up teeth 239—239, extending therefrom in fixed relation as for example radially, the teeth being yieldable or yieldably mounted on the elements if desired. Cylinder 236 rotates in a counter-clockwise direction, as seen in Fig. 3, during progress of the machine from left to right. Teeth 239 accordingly can be made to comb the ground and tend to raise material in front of the cylinder up and over the same and to the rear thereof.

As seen in Fig. 1, teeth 239 on adjacent elements 238, are arranged in a series of planes at right angles to shaft 235, so as to provide pathways about the drum between adjacent rows of teeth. Strippers 240—240 are arranged between the rows of teeth, starting at a point slightly to the rear of cylinder 234 and extending downwardly and forwardly and then upwardly and rearwardly about the cylinder, approaching the cylinder closely at a point beneath and gradually receding from the cylinder until at a point substantially above the cylinder, the strippers having receded a distance substantially equal to the length of teeth 239. Thus as cylinder 234 rotates, the teeth project from strippers 240, the maximum amount at the bottom of the pick-up, but gradually recede within the strippers until they disappear entirely at a point slightly to the rear of the highest point. They thus operate to raise the material to be baled but disengage therefrom at the point of greatest elevation and this without the benefit of any mechanism whatever within cylinder 234.

Strippers 240 are attached to brackets 241, spaced at proper intervals, along a plate 242 and braced as by struts 243 also connected to plate 242. Strippers 240 at their upper ends are supported as by brackets 244 and extend rearwardly for a distance over a rearward extension 245 of plate 242. Strippers 240 may be of any suitable form, but in the present instance are of channel section as indicated in Fig. 20.

Plate 242 constitutes part of a frame work for supporting cylinder 234 and its attached parts, and serves as a spacing member for forwardly reaching struts 246 and 247, fixed with a shaft 248 journaled in above mentioned bracket 45 and also in bracket 48. Struts 246 and 247 carry respectively bearings 249 and 250 in which is journaled above mentioned shaft 235. The entire pick-up unit may accordingly be raised and lowered about shaft 248 by oscillating said shaft. Shaft 248 also has an arm 251 extending downwardly and rearwardly therefrom and to which is connected a spring tooth 252 tensioned between it and a bracket 253 fixed with angle iron 35, an adjusting bolt 254 and nut 255 being interposed if desired. The pull of spring 252 tends to cause counterclockwise rotation of shaft 248 and accordingly causes a lifting force in arms 246 and 247, and in practice this pull is great enough to overcome the weight of the parts supported on arms 246 and 247 and cause them to be raised to the extent permitted by the associated construction.

A second spring 256 also connected to arm 251 extends rearwardly to a lever 257 having an arm 258, a fulcrum 259 and an arm 260, fulcrum 259 being supported as by a bracket 261 from above mentioned Z-bar 49. In the dotted position of lever arm 258, spring 256 is relaxed sufficiently so that spring 252 may raise the pick-up for transportation purposes, but for operation, lever arm 260 is placed in the full line position and retained as by a hook or detent 262, thus placing lever arm 258 in full line position and exerting tension on spring 256. Spring 256 in conjunction with the weight of pick-up P, overcomes spring 252, pulling arm 251 backwardly and lowering struts 246 and 247 to place the pick-up in operative position.

At a predetermined point in the downward movement, a stop member 263 pivoted as on a bolt 264 contacts above mentioned truss rod 46 and limits the downward movement of the pick-up. Stop member 263 may be adjustable in any suitable or convenient manner, in the present instance being in the form of an eccentric, pivoted on bolt 264 and clamped thereby in desired relation to arm 251. As will be apparent the adjusted working position of pick-up P can be changed slightly by loosening bolt 264 and shifting eccentric stop member 263 to a new position and clamping it in place. Other suitable or well-known adjustable stop means are contemplated as equivalent.

As above noted, strippers 240 are anchored to the extremities of plate 242. At the ends of cylinder 234, however, additional strippers 265 and 266 are combined with flare sheets 267 and 268 mounted in the identical manner on plate 242 as by brackets 241 and 244, braces 269 and 270 extending for example from bearings 249 and 250 to flare sheets 267 and 268 for steadying them against the additional weight.

Strippers 240, 265 and 266 extend rearwardly over plate extension 245 beyond brackets 244 and the ends of the strippers as seen in Fig. 1, and are tapered rearwardly somewhat so that the slots resulting between the strippers increase slightly in width at the discharge ends thereof. For that reason any material caught in the slots and urged rearwardly by the teeth 239 will tend to become released and the slots cleared. Flare sheet 267 extends rearwardly within a guard sheet 271 carried by the feeding mechanism and flare sheet 268 extends in a similar manner inside of a guard sheet 272 also forming part of the feeding mechanism. Pick-up P is therefore free to rise and fall while maintaining a relatively closed pathway or channel for picked up material into the feeding mechanism. As seen in Fig. 3, a plate 273 is hinged at 274 to Z-bar 50 and is pressed upwardly as by a spring 275 against the underside of rearward plate extension 245. This closes the space which would otherwise exist between extension 245 and Z-bar 50. Plate 273 can rise and fall with pick-up P and maintain the closed channel between the pick-up and the feeding mechanism.

Under some conditions, a strong wind may tend to blow material being picked up out of the channel between flare sheets 267 and 268. Under other conditions, material may fail to follow fingers 239 and roll up ahead of the pick-up. To counteract these tendencies, a hold-down, generally designated as 276, is provided comprising a series of strips 277—277 fixed with a bar 278 pivoted as at 279 and 280, to brackets 281 and 282 carried in the present instance by flare sheets 267 and 268. Strips 277 extend rearwardly over strippers 239 and are yieldably pressed down against material moving over the pick-up. Arm 283 extends upwardly from bar 278 and has a spring 284 extending rearwardly to an anchorage 285 on flare sheet 267. The tension of spring 284 tends to rotate bar 278 in a counterclockwise direction as seen in Fig. 3, thereby pressing strips 277 down against the material as above mentioned. Material once started under hold down 276 cannot be blown away even by a strong wind and the cooperation between teeth 239 and hold down 276 eliminates any tendency for material to roll up ahead of the pick-up instead of traveling over onto the conveyor.

Feeding mechanism F cooperates with pick-up P and has above mentioned guard sheets 271 and 272 and a back sheet 286 for preventing passage of material across the feeder and over the back, and also for preventing access of wind to the material being baled. Back sheet 286 may be inclined forwardly if desired. Z-bars 49 and 50, together with brackets 45 and 48 constitute a rectangular framework for carrying a series of rolls supporting and actuating above mentioned apron 25. This is seen in Figs. 4 and 5. Z-bar 49 supports a shaft 287 on which is mounted a roller 288, suitable bearings as 289 and 290 of well-known type being carried by Z-bars 49 and 50 respectively, and carrying the rotatable shaft 287. In similar manner, bearings 291 and 292, Fig. 1, support a shaft 293 on which is mounted a roller 294. Above mentioned apron 25 is trained about rollers 288 and 294 and may be of any suitable or well-known type, in the present instance constituting a smooth, wide web of suitable material, such for example as rubber belting, although other suitable frictional material may be substituted within the contemplation of the invention. Roller 288 may advantageously have a knurled or roughened periphery and may be driven by mechanism as will appear to cause movement of apron 25 as indicated. For maintaining the tension of apron 25, bearings 291 and 292 may be carried on adjustable supports as 295, it being necessary to describe only the one associated with bearing 291 since it is typical. Support 295 has a slot 296 engaged by a bolt or the like 297 carried by Z-bar 49, and bearing 291 is slidable in a slot 298 in Z-bar 49, support 295 and bearing 298 being urged to the right as seen in Fig. 4 by a bolt or the like 299 fixed with the support as by a bolt or the like 300 and extending through an ear 301 to which it is clamped as by nuts 302—302. By suitably adjusting nuts 302—302, shaft 293 and accordingly roller 294 may be moved in a direction to adjust the tension of apron 25. Since bearing 292 may be adjusted in identical manner, roller 294 may be corrected in its relation to roller 288 to insure proper and accurate running of apron 25.

It will be apparent that material to be baled stripped from teeth 239 and passing over plate 273 will be moved by apron 25 toward opening 212 in plate 33 and accordingly directly into the baling chamber. It will also be apparent that at such times as the opening is closed as by wall 140 of plunger 136, apron 25 may continue to run and slip beneath material momentarily blocked in its movement by the plunger.

The feeding of material is further effected by above mentioned feed drum 26, Figs. 3 to 6 inclusive. Drum 26 is fixed on a shaft 303 and rotates in the direction indicated so that its periphery travels in the same direction as apron 25 in the region where the drum is next to the apron. Shaft 303 is carried in bearings 304 and 305, Fig. 3, which are supported in turn on arms 306 and 307, fixed with a sleeve or pipe 308 journaled on a member 309 carried by back sheet 286 and a front sheet 310, constituting part of the feeder. Drum 26 may accordingly rise and fall about member 309 as an axis so that it may rest or "float" on material being baled indicated as M, Figs. 4, 5 and 6. Drum 26 is of substantial weight and acts to preliminarily compact and compress material M into a ribbon-like mass which is urged by the travel of apron 25 and drum 26 directly into opening 212. This is very effective in getting a large volume of material through the opening in a given time, the volume of the usual loose fluffy material being reduced to a very small fraction of its original volume before passing through the opening. This is in contrast to the usual operation in which the material is still loose when it arrives at the feed opening and is stuffed down into the opening by a feeder head.

Drum 26, as above noted, floats on the material and is free to rise and fall as the volume increases or decreases during operation, the density of the preliminarily compressed material depending on the downward pressure of the drum which can be determined as desired.

The downward pressure of drum 26 is transmitted through material M to apron 25 and to assist apron 25 in resisting this pressure, supporting rollers 311 and 312 are supported beneath apron 25 in the region of the downward pressure of drum 26. Rollers 311 and 312 may be mounted on shafts 313 and 314 carried in bearings of any suitable or well-known type as 315, Fig. 6.

Assuming drum 26 and apron 25 to be traveling as above noted in the directions indicated, a continuous stream of material M will be preliminarily compressed and conveyed into bale chamber B through opening 212, as clearly indicated in Fig. 6. Momentarily and periodically, however, plunger 135 comes rearwardly toward the observer in Figs. 4, 5 and 6 and blocks opening 212 as shown in Fig. 4. Apron 25 and drum 26, however, continue to rotate and material continues to be urged through the compressing space between drum 26 and apron 25 and to pile up in a mass against plunger 135 as shown. A substantial volume of such material is compressed into the space to the left of drum 26 and between it and plunger 135 during this brief interval. Drum 26 carries cleats 316—316 on its periphery for increasing its traction on the material being baled and if material is unable to move into baling chamber B, cleats 316 may exert a lifting effect on the material so as to raise the body forming between the drum 26 and plunger 135, to completely fill the substantially triangular space resulting between said drum and plunger. If no room for further material is present, additional material forced in may tend to lift drum 26 to give more space between the drum and plunger, this action depending upon whether a sufficient volume of material is coming from pick-up P. It will be apparent that a relatively dense mass of material (which is usually fairly resilient) is built up against plunger 135 in anticipation of the clearing of the opening 212. Accordingly, almost instantaneously upon the withdrawal of plunger 135, this body or slug of material passes through opening 212 into bale chamber B as clearly indicated in Fig. 5. This body of material being somewhat compact is thought to retain its triangular shape to some extent and aid in filling in the top of the bale chamber.

Furthermore, if the volume of incoming material is sufficiently large, bale chamber B may fill completely full and the material build up additionally outside of opening 4 in a manner similar to what it does in the case where opening 212 is closed. In any event a liberal supply of material to be baled is kept in readiness to enter bale chamber B at all times.

Returning to a more detailed description of drum 26, as seen in Fig. 3, shaft 303 is rotatably supported in bearings 304 and 305 being driven by a sprocket or the like 317, fixed with the shaft. Shaft 303 also carries heads as 318—318 fixed with bearings 304 and 305 and having, if desired, inturned flanges as 319. Heads 318—318 may remain stationary relatively to the drum, whereas inner heads as 320 are fixed with shaft 303 and constitute the ends of the rotative part of the drum. Heads 320 may have outwardly turned flanges as 321 and an outer shell 322 in the present instance wrapped about flanges 321 to form the periphery of the drum. Thus a drum is provided in which the periphery only rotates, whereas the heads remain stationary. As a result, there is little or no tendency toward wrapping or tangling of stringy material about the drum or shaft 303. In other words, no small diameter parts rotate within the feeder.

Above mentioned cleats 316 may be of any suitable type, in the present instance V-shaped channel members or angle irons with their open sides applied to shell 322, welded or otherwise secured in place have proven to be very satisfactory. In order to increase the effect of cleats 316 slightly, bosses as 323 may extend outwardly and in the present instance rearwardly relatively to the direction of rotation on the half of the cleats toward the front of the machine, as shown in Fig. 3. Stop means as 324 and 325 may be supported upon back sheet 286 and front sheet 310 respectively, for supporting drum 26 clear of apron 25 at such times as no material is being fed, to prevent direct contact between cleats 316 and apron 25.

As above suggested, drum 26 may swing up and down about member 309. Accordingly, it is convenient for the drive to sprocket 317 to originate on the center line of member 309. Various well-known expedients for this are contemplated, but for the purpose of illustration, member 309 comprises a journal or pilot 326, an upset collar 327, a threaded shank portion 328, a journal portion 329 and a reduced threaded portion 330. A nut 331 may be engaged with shank portion 328 and a nut 332 may be engaged with shank portion 330. Nut 331 may clamp front sheet 310 between itself and collar 327 while nut 332 may clamp back sheet 286 between itself and the shoulder, between shank 330 and journal portion 329. In this way member 309 may brace and maintain the spacing of back sheet 286 and front sheet 310. Sleeve 308 is journaled on member 309 and collars as 333 and 334 serve to properly locate sleeve 308 and prevent undesired endwise movement thereof. A hub portion 335 fixed on a shaft 336 to be more fully later described is journaled on above mentioned pilot journal 326, and has a sprocket or the equivalent 337 engaging a chain 338 for driving above mentioned sprocket 317, the hub portion also having a sprocket 339 engaging a chain 340 constituting a drive for apron 25. As seen in Fig. 14, chain 340 extends downwardly from sprocket 339 to an idler sprocket 341 rotatably supported on a shaft 342 below Z-bar 50, the chain on its upward run engaging a sprocket 343 fixed with above mentioned shaft 287. Shaft 287 carrying roller 288, as above noted, causes rotation of roller 288 in the proper direction to drive apron 25.

A modified construction for driving apron 25 from the end remote from baling chamber B is indicated in Figs. 15 and 16. By this expedient, the apron may be advanced more closely to opening 212 and in fact may project into the opening slightly, thus resulting in more efficient feeding of material. Under these conditions, a roller 344, which may be substantially smaller in diameter than above mentioned roller 288 is mounted on a shaft 345 carried in suitable bearings such as 315 above described. Roller 344, however, because of its smaller size, may be placed to extend somewhat into the feed opening as shown, it being so placed that only the minimum safe clearance exists between feed apron 346 and above mentioned knife 150. Under these conditions, it may be advisable to drive through one of the larger rollers and accordingly, as shown in Fig. 15, a shaft 347 corresponding in position to above mentioned shaft 313 has a sprocket 348 fixed thereon similar to above mentioned sprocket 343, a chain 349 engaged with a sprocket 350 corresponding to above mentioned sprocket 339, engaging sprocket 348 and idler sprockets 351 and 352, suitably supported beneath sprocket 348. In this manner rotation of sprocket 348 in a direction opposite to sprocket 350 is obtained in addition to accommodating the relatively offset position of sprocket 348. Shaft 347 leads entirely through the feeder and as shown in Fig. 16 carries a sprocket 353 driving, through a chain 354, a sprocket 355 fixed with a shaft 356 on which is mounted a roller 357 corresponding in position to above mentioned roller 294. Roller 357 may be knurled or otherwise roughened for more positive engagement with apron 346. Shaft 347 has a roller 358 corresponding in position to above mentioned roller 311. Although roller 358 does not have enough surface in contact with apron 346 to drive the latter, sprocket 353 and 355 and rollers 357 and 358 may be so chosen that the surface speeds of roller 358 and apron 346 are the same, so that although roller 358 is "alive" there is no slipping between it and apron 346 to damage the apron.

A sprocket 359 may be journaled on a stud or the like 360 carried by a lever 361 pivoted on a fulcrum 362, urged in a counterclockwise direction as by a spring 363, fulcrum 362 and spring 363 being supported from or by a Z-bar 364 corresponding to above mentioned Z-bar 50. The pull of spring 363 will therefore yieldingly urge sprocket 359 upwardly to maintain the proper tension in chain 354.

The drives for the feeding and pick-up units are as follows:

Above mentioned shaft 336, as seen in Fig. 1, extends lengthwise of bale chamber B, through a bearing 365 supported by bale chamber B and carries a sprocket or the like 366, a safety release clutch 367 of well-known or suitable type being interposed, if desired, and the whole enclosed for safety and convenience with a housing 368. A chain 369 engages sprocket 366 and a sprocket 370 mounted on a shaft 371 journaled in a housing 372, as more particularly shown in Fig. 18, shaft 371 carrying a bevel gear 373 meshing with a bevel gear 374 on above mentioned shaft 72, shaft 72 as above indicated carrying idler 71 which is driven by belt 65. Accordingly actuation of belt 65 by engine E causes driving of shaft 336, drum 26 and apron 25. Shaft 371 may be allowed to project forwardly from housing 372, as shown in Fig. 18, or may be terminated inside the housing in suitable or well-known manner as suggested in Fig. 1.

Pick-up cylinder 234 under most conditions, is driven from the ground as follows. Ground wheel 41 as particularly shown in Fig. 2 carries a sprocket or the like 375 in the present instance the underside thereof engaging the upper run of a chain or the equivalent 376, extending between an idler sprocket 377 and a sprocket 378 fixed with a shaft 379. With this arrangement, clockwise rotation of sprocket 378, as seen in Fig. 2, is obtained from counterclockwise rotation of ground wheel 41, the normal direction of rotation resulting from forward movement of the bailer. Sprocket 377 is journaled on a stud or the like 380, which may for example be fixed with a lever 381 pivoted at 382, for example to above mentioned bracket 37. Lever 381 may accordingly swing about pivot 382 for shifting sprocket 377 for adjusting the tension of chain 376. Suitable means may be provided for maintaining the adjustment as for example a strut 383 pivoted at 384 to lever 381 and having a slotted connection at 385 with a clamping unit generally designated as 386.

Loosening clamp 386 will provide for shifting of lever 381, the clamp being again tightened when the desired adjustment is reached.

Shaft 379 is journaled in a bearing 387 carried in a bracket 388 fixed with baling chamber B. Shaft 379 is also journaled in a suitable bearing 389, as more particularly shown in Fig. 1, carried by bale chamber B and may be fitted with a universal joint generally designated as 390 connecting an extension shaft of suitable or well-known type as 391 connected as by a universal joint 392 with above mentioned shaft 235. A safety or overrunning clutch generally designated as 393 of suitable or well-known type may be interposed, if desired, within the contemplation of the invention.

Modifications of these drives are contemplated within the scope of the invention. For example, if a powerful tractor is available, it is possible to dispense with engine E in a baler sold to operate with such tractor. Thus, as suggested in Fig. 21, shaft 371 may carry a universal joint generally designated as 394, connecting it with a power take-off shaft 395 of suitable or well-known type, operated from the tractor in well-known manner. Shaft 371 thereby in this instance becomes the main drive shaft or input shaft of the machine. Rotation of shaft 371 drives the feeding mechanism through above mentioned chain 369 and a shorter belt 396 is applied about pulley 71 and fly wheel 66. Shaft 72 therefore becomes a driving instead of a driven shaft and actuates the main plunger drive of the baler. Therefore, from a manufacturing standpoint, there is exceedingly little difference between an engine driven machine and a power take-off driven machine and owing to the dual function of shafts 72 and 371, large economies in manufacture, storage and distribution may be effected.

Under some conditions, as for example, very slippery fields, a ground drive of pick-up P is impractical. Because of the novel arrangement and organization of parts, a power drive may be very readily obtained. As seen in Fig. 22, sprockets 378 may be removed from the position on shaft 379, shown in Figs. 1 and 2, and applied on the opposite side of bale chamber B. At the same time a sprocket as 397 may be applied in any suitable manner to journal portion 109 of crank shaft 81. A chain 398 engages sprockets 378 and 397 whereupon operation of the crank shaft will cause rotation of pick-up cylinder 236. Sprocket 397 may be fixed with journal portion 109 in any suitable or well-known manner, in the present instance having a hub portion 399 seated in a socket 400, a screw or the like 401 extending through a bore 402 and being engaged in sprocket 397. Tightening the screw clamps the sprocket 397 securely in place as will be apparent.

As above suggested, bales formed in the baling chamber B are divided in a novel manner and without interrupting the baling action. For this purpose, a slotter member which may conveniently be of fork-like configuration generally designated as 403, Fig. 12, is used. Member 403 comprises individual finger members 404 and 405 hinged at 406 and 407 to a spreader member 408 having a collar or roller 409 journaled thereon for a purpose to appear. Member 403 therefore comprises a unit which in insertable within the bale chamber at the proper time without disturbing the baling action. Member 404, as seen in Fig. 8, has grooves 410 and 411 on opposite sides thereof and member 405 in similar manner has grooves 412 and 413. These grooves, when the finger member is inserted in the bale being formed, provide pathways through the bale for the insertion of baling wires or other suitable binding members. In the present instance, there are two finger or needle members for accommodating two binding wires.

As above suggested, member 403 is inserted in the space immediately behind plunger 135 between it and the material being baled at the beginning of the retracting movement of the plunger, whereupon the operator riding on seat 27 takes the ends of wires 414 and 415 trailing from a divider unit 416 previously inserted and inserts said wires respectively in grooves 411 and 413. He then takes new wires from a supply carried in a casing 417 (Fig. 1), and supported from bale chamber B as by one or more brackets 418, inserting one in groove 410 and another in groove 412. The wires of one bale being separated from those of the preceding bale by members 404 and 405, there is no possibility of interlocking of wires of successive bales. The operator on seat 28 then has both ends of wires 414 and 415 projecting on his side of the machine, and which he proceeds to tie, twist or otherwise connect together in suitable or well-known manner. Member 403 moves backward gradually as the bale is formed and member 416 is removed from the baled material entirely, as soon as wires 414 and 415 are tied, and placed in readiness to be reinserted at the proper time.

419 and 420 represent the wires on a bale which is complete and merely being forced to the rear by succeeding bales being formed. Within the contemplation of the invention the insertion and retraction of members 403 and 416 may be accomplished in various ways, in the present illustrative embodiment this being accomplished automatically as follows.

Extending from bale chamber B is a bracket or runway generally designated as 421, Figs. 7 to 9 inclusive, in the present instance consisting of upper and lower T bars 422 and 423 connected at their outer ends as by a strut or post 424 and hinged, if desired, as at 425 and 426 to flanges 427 and 428 respectively of above mentioned plate 32. By virtue of hinged connections 425 and 426, bracket member 421 may be swung or folded as indicated in Fig. 9 to narrow the machine for transportation. A brace 429 may be hinged to flange 427 as at 430 and engaged with a pin or other detent 431 on T bar 422 for maintaining bracket 421 in the desired position extending from bale chamber B. Brace 429, as seen in Fig. 17, in the present instance may be sprung upwardly as indicated to disengage it from detent 431 to provide for swinging of bracket 421.

For inserting the slotter member a holder generally designated as 432 travels on bracket or runway 421. Holder 432 may be of various types but in the present instance comprises an open sided socket-like member having a side wall 433, a top wall 434, a bottom wall 435 and an end wall 436. Member 432 is suitably carried from bracket 421 as by a traveler-plate 437 fixed with end wall 436 as by shouldered bolts 438 and 439. Bolts 438 and 439 extend to a plate 440 spaced from plate 437 on the other side of bracket 421, as by above mentioned bolts 438 and 439, grooved rollers 441 and 442 respectively, being journaled on bolts 438 and 439 and engaging T rails 422 and 423 as indicated in Fig. 10. Plates 437 and 440 extend outwardly from holder 432 as seen in Figs. 7 and 9 and are connected in similar manner as by shouldered bolts 443 and 444 having journaled thereon grooved rollers as 445 and 446. The engagement of rollers 441, 442, 445 and 446 with T rails 422 and 423 maintains carrier plates 437 and 440 in proper relation to bracket member 421 but provides for movement of carrier plate 437 and holder 432 in guided relation along the bracket member. Accordingly, the slotter member as 403 inserted in holder 432 may be guided into the bale chamber through suitable slots as 447 and 448 in plate 32 into bale chamber B immediately behind plunger 135. Flanges, as above mentioned members 427 and 428, and other flanges as 449 and 450 may define the edges of slots 447 and 448 to aid in guiding finger members 404 and 405 of element 403.

As seen in Fig. 9, holder 432 may be advanced automatically to insert element 403 by a pull on a cable 451, anchored as by a fitting 452 engaging one or another of openings 453 in carrier plate 440, any suitable anchoring expedient being contemplated, but in the present instance member 452 having a rearwardly extending tail 454 engaging the side of plate 440 next to rollers 445, etc., so as to tend to space cable 451 somewhat from plate 440 while preventing displacement of fitting 452 so long as a pull is exerted on cable 451. Cable 451 passes about a pulley 455 journaled on a pivot 456 suitably supported from bale chamber B and in the present instance into a housing 457 containing a compression spring 458, the cable passing in the present instance entirely through spring 458 and engaging a head or plunger 459 slidable in housing 457. Housing 457 is suitably anchored to bale chamber B as by a bracket 460 and a closure 461 of suitable or well-known type may be provided for the end of housing 457. Spring 458 abuts a head portion 462 of housing 457 through which passes above mentioned cable 451. The tendency to expansion of spring 458 accordingly keeps a continuous tension on cable 451 tending to urge holder 432 into the dotted position, shown in Fig. 7, and the holder may be latched in its outer or full-line position by a detent 463 engaged with a latch portion 464 of a lever 465 fulcrumed as at 466 on T rail 422.

An ear 467 on lever 465 engages a spring 468 and in the present instance surrounding a bolt 469 fixed with T rail 422 and engaging a lock member or the like 470 adjustably fixed on bolt 469. The expansion of spring 468 against ear 467 accordingly tends to maintain latch portion 464 engaged with detent 463. Accordingly, clockwise rotation, as seen in Fig. 9 of lever 465 about fulcrum 466 will release detent 463, whereupon cable 451 will propel holder 432 toward bale chamber B and the dotted position shown in Fig. 7. Holder 432 may be retracted against the pull of cable 451 as by a handle 471, latch 464 being automatically engaged with detent 463 by action of spring 468 when holder 432 reaches its maximum outer position.

Lever 465 may be actuated by a trip rod 472 reciprocably supported lengthwise of bale chamber B, as for example in brackets 473, 474 and 475, the lever having for example a bifurcated end 476 engaging a collar, abutment, or connection 477 in the present instance adjustably fixed with rod 472 as by a set screw 478. Rod 472 is urged forwardly as by a spring 479 anchored for example to bracket 473 and also to a collar 480 which is in the present instance fixed with rod 472 as by a set screw 481. Rod 472 is moved rearwardly upon completion of a bale as will appear, but this may be more clearly understood after a brief explanation of the operation up to this point.

Holder 432 has a false upper wall or detent 482, Fig. 10, which when member 403 is removed occupies the dotted position shown in Fig. 10. Detent 482 is sprung upwardly by insertion of member 403 and exerts substantial frictional engagement with the outer ends of members 404 and 405 of element 403. The operator on seat 27, as soon as element 403 is released from a newly formed bale, enters the ends of fingers 404 and 405 remote from portion 408 into slots 447 and 448 respectively and then forces the ends of members 404 and 405 adjacent portion 408 into holder 432 against the resistance of detent 482. The parts remain in this position until such time as rod 472 is moved rearwardly which, as will appear, is always at a time when plunger 135 is in substantially its rearmost position. The location of bracket 421 is such that plunger 135 passes somewhat beyond the position of fingers 404 and 405. Rearward movement of rod 472 accordingly releases holder 432 which immediately propels fingers 404 and 405 through slots 447 and 448 into contact with wall 139 of plunger 135, this preventing further movement of the fingers temporarily. Plunger 135, however, immediately starts its retracting movement while the material which has just been compressed is held from following the plunger to any substantial extent by dogs 184 to 201, inclusive. This leaves an empty space behind plunger 135 for the first part of its return stroke, and as soon as wall portion 139 clears the end of fingers 404 and 405, holder 432 under the influence of spring 458 completes its movement and inserts fingers 404 and 405 into the empty space thus existing behind plunger 135. To assist in guiding fingers 404 and 405 into the correct position, a spring 483 may be fixed in suitable manner with flange 427 and curved to define the position for insertion of finger 404. This increases the efficiency of the inserting operation in view of the considerable motion of the machine in traversing ordinary field surfaces.

Substantially immediately, plunger 135 completes its retracting stroke, a new feed of material enters between plunger 135 and fingers 404 and 405 and plunger 135 executes another compressing stroke, the new feed of material being compressed about fingers 404 and 405 and material already compressed by previous strokes being moved backwardly a short distance in bale chamber B. Fingers 404 and 405 move backwardly in similar manner, member 403 being "baled into" the material. Rearward movement is permitted by slots 447 and 448 and the outer end of member 403 is accordingly forced out of holder 432 and moves gradually backward with the baled material. At some convenient time, the operator on seat 27, pulls holder 432 back to the latched position preparatory to receiving the next finger member to be released. Spring 483 is readily forced aside by movement of finger 404 and wires are inserted in the grooves 410 and 412 as above described while the fingers continue to move backwardly. At a certain point, roller 409 encounters a cam track 484 in the present instance supported from plate 32 and inclined rearwardly and outwardly from bale chamber B. Cam track 484 is strongly supported from a plate or strip 485 as by struts 486 and 487 and plate 485 rests, when necessary, against the relatively compact material being baled. Continued rearward movement of member 403 causes roller 409 to ride away from bale chamber B on inclined track 484. Since fingers 404 and 405 are slightly tapered as indicated in Fig. 12, this retracting movement loosens the fingers in the bale to such an extent that members 403 can be readily removed by hand when convenient for replacement in holder 432.

In due time member 403 will have moved rearwardly clear of track 484 and finger 404 will contact a roller 488 or other abutment on a lever 489 fulcrumed as at 490 to above mentioned rod 472. Lever 489 is urged in a clockwise direction as by a spring 491 engaged between lever 489 and an anchorage 492 preferably on rod 472, a stop pin or the like 493 engaging rod 472 to prevent further clockwise movement of lever 489 beyond a desired point. Spring 491 is so chosen that further rearward movement of finger 404 overcomes above mentioned spring 479 rather than spring 491, causing rearward movement of rod 472 and releasing holder 432 to insert another finger member as above described. Further rearward movement of finger 404 overcomes spring 491, permitting finger 404 to pass abutment 488 as indicated.

Under certain conditions, as for example when baling material containing a large percentage of chaff or the like, the lower portion of the bale, as is common in all baling systems, tends to be more dense than the upper portion, resulting in a slightly faster rate of travel of the lower portion of the bale during the brief interval that the material is being compressed. Under these conditions, finger 405 will tend to move somewhat further than finger 404, so that spreader portion 408 will take on a somewhat slanted position as indicated in Fig. 24$^c$. This might result in binding of fingers 404 and 405 in slots 447 and 448. In this event, the fingers are free to shift as necessary, relatively to spreader 408 by virtue of hinged connections 406 and 407. The divider member then appears as seen at the right in Fig. 24$^c$ and passes freely through the slots 447 and 448, there being enough clearance between the fingers and slots to avoid binding in spite of the slightly reduced vertical distance between fingers 404 and 405 under these conditions.

Fingers 404 and 405 are readily restored to normal position relatively to spreader 408 by hand or in any suitable manner, a certain amount of frictional resistance in hinges 406 and 407 being provided if desired.

Under certain conditions it is desirable to be able to adjust the point at which abutment 488 is contacted by the divider members such as 403 and 416. This is for the purpose of adjusting the length of the bales being formed. Furthermore, the wires as 414 and 415 are ordinarily fastened with a certain amount of slack, the bales expanding as they are released from baling chamber B to take up this slack and resulting in the desired tension in the wires. With different materials, or even the same material, under different conditions, the amount of this expansion varies so that the point of tripping by abutment 488 needs to be changed to suit conditions even if the same length bale is desired.

This might be done in several ways, but in the present illustrative embodiment, brackets 474 and 475 constitute part of a unit generally designated as 494 and which may be secured as by screws 495 to a strip or plate 496 fixed to baling chamber B as by screws 497. A collar 498 on rod 472 determines the forward extent of movement of rod 472 by engaging bracket 474, and a collar 499, spaced from bracket 474 and fixed on rod 472, may be provided to limit the rearward movement of rod 472, thereby relieving above mentioned lever 465 from the duty of holding the rod against the force developed by rearward movement of finger 404, necessary to actuate lever 489 and overcome spring 491. Unit 494 may be removed from strip 496 by removing screws 495 and replaced at the desired point by inserting screws 495 in appropriate openings, as 500, a plurality of which are provided at suitably spaced points. Above mentioned collars 477 and 480 may be loosened on rod 472 during this adjustment and then anchored again to rod 472 in the appropriate position to actuate lever 465 and to give the proper tension in spring 479. By these adjustments, a wide variation may be secured in the length of bales produced and a given length of bale can be secured under a great variety of varying conditions.

To receive the considerable momentum of holder 432, when it moves to insert finger member 403, a pad or abutment 501 may be provided and secured to a stiffening flange 502 on plate 32 and united if desired with above mentioned flanges 449, 427, 428 and 450.

Above mentioned track member 484 may be fixed with plate 432 in any suitable manner as by a bolt 503.

Under certain conditions, it may be desirable to omit wheel 55 and its attached parts. For this purpose, platform 53' may comprise spaced beam members 504 and 505 as seen in Figs. 24 and 24ª, approaching each other forwardly of engine E and including between them a plate 506, the beams and plate being solidly united as by bolts 507—507. Plate 506 constitutes a draw element and may be provided with openings 508—508 for reception of bolts as 509 securing to plate 506 a fitting 510 of suitable or well-known type for engagement with a draw bar 511 of a tractor or other drawing means not shown. Fitting 510 may accordingly be raised or lowered by engagement of bolts 509 with appropriate holes 508 so that platform 505 will be substantially level when supported from a tractor or the like.

Platform 505 must be supported at times when the baler is disconnected from a tractor. For this purpose, a stand element generally designated as 512, which may be bifurcated to engage the sides of plate 506, is pivoted to said plate as by a bolt 513. A stop bolt 514 engages an edge 515 of plate 506 which may be offset from edge 516 of the plate if desired to arrest clockwise rotation of member 512 about bolt 513, and consequent downward movement of platform 505. A stable support is thereby furnished for platform 505. If the tractor drawbar is coupled to fitting 510, forward motion of the assemblage causes counterclockwise rotation of member 512 with slight lifting of platform 505 and release of member 512 from supporting relation to the ground and plate 506. Member 512 may be readily swung upwardly to the dotted position in Fig. 24 and retained by any suitable means such as a hook 517. Additional holes as 518 may be provided for example in member 512 to adjust member 512 for leveling platform 505 to suit conditions. For example, if the machine is to be used for stationary baling, and at the most convenient location the ground is not level, member 512 may be adjusted so that the machine will rest substantially level on the slanted ground. The machine may be operated in the above described manner and material to be baled forked directly onto apron 25 when the baling will proceed as above described.

The above being a complete description of the illustrative embodiment of the invention, what is claimed as new and desired to be secured by Letters Patent of the United States is:

1. In a baler, a baling chamber, means for dividing material being compressed in the chamber including a slotter finger positioned to be inserted into the chamber to provide a pathway for a binding element for binding a bale formed in said chamber, holding means for supporting the finger and adapted to insert the finger into the chamber to be baled into and to move therealong with the material being baled, a trip connected to control the holding means for predetermining the time of insertion of the finger, and means associated with the baling chamber for loosening the finger from the compressed material incident to its movement therewith, preparatory to reinsertion of said finger in the chamber.

2. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, holding means for supporting the finger and adapted to insert the finger into the chamber, and means associated with the baling chamber for loosening the finger from the compressed material incident to the movement thereof preparatory to reinsertion of said finger in the chamber.

3. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, holding means for so supporting the finger, a trip associated with the finger and adapted to predetermine the times of insertion of the finger, and means associated with the baling chamber for loosening the finger from the compressed material incident to the movement thereof preparatory to reinsertion of said finger in the chamber.

4. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, means adapted to insert the finger into the material being compressed, a trip connected to control said means for predetermining the times of insertion of the finger, and means associated with the baling chamber for loosening the finger from the compressed material incident to the movement thereof preparatory to reinsertion of said finger in the chamber.

5. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, holding means for so supporting the finger and adapted to insert the finger into the compressed material, and means for loosening the finger preparatory to reinsertion of said finger in the compressed material.

6. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, means adapted to insert the finger into the material being compressed, and means for loosening the finger from the compressed material incident to the movement thereof preparatory to reinsertion of said finger in the chamber.

7. In a baler, a baling chamber, means for dividing material being compressed in the chamber including a slotter finger positioned to be inserted into the chamber to be baled into and to move therealong with the material being baled to provide a pathway for a binding element for binding a bale formed in said chamber, a trip connected to predetermine the times of insertion of the finger, and means for loosening the finger from the compressed material incident to the movement thereof preparatory to reinsertion of said finger in the chamber.

8. In a baler, a baling chamber, means for dividing material being compressed in the chamber, said means including a slotter finger positioned to be inserted into the chamber to be baled into and to move therealong with the material being baled to provide a pathway for a binding element for binding a bale formed in said chamber, and means for removing the finger from the compressed material incident to its movement in said chamber preparatory to reinsertion of said finger in the chamber.

9. In a baler, a baling chamber, means for binding bales of material in the chamber, said means including a slotter unit comprising a plurality of slotter fingers adapted for extension into the baling chamber, and having means for guiding a binding element into the material being baled, and a spreader element for spacing the fingers the desired distance apart, said fingers being of gradually increasing cross-section from the free ends thereof toward the point of attachment of said spreader element.

10. In a baler, a baling chamber, means for binding bales of material in the chamber, said means including a slotter unit comprising a plurality of slotter fingers adapted for extension into the baling chamber, and having means for guiding a binding element into the material being baled, a spreader element for spacing the fingers the desired distance apart, and hinged connections between the fingers and spreader.

11. In a baler, a baling chamber, means for binding bales of material in the chamber, said means including a slotter unit comprising a plurality of slotter fingers adapted for extension into the baling chamber, and having means for guiding a binding element into the material being baled, a spreader element for spacing the fingers the desired distance apart, and a collar journaled on the spreader element.

12. In a baler, a baling chamber, means for binding bales of material in the chamber, said means including a slotter unit, said unit comprising a plurality of slotter fingers adapted for extension into the baling chamber to be baled into the material being compressed and a spreader element for spacing the fingers the desired distance apart, and said baler having a member inclined rearwardly and outwardly away from the material being baled for engaging said spreader element and urging said slotter unit out of the baled material as the latter progresses rearwardly in the course of the baling process.

13. In a baler, a baling chamber, means for binding bales of material in the chamber, said means including slotter units having part of their length insertable into the baling chamber to be baled into the compressed material, the remainder of said length projecting therefrom, an abutment supported from the baler in the path of travel of the projecting portion of said slotter units and positioned so as to be contacted by one of said portions of the length of said slotter units at the point of rearward travel thereof where it is desired that another slotter unit be inserted into the baling chamber, and means actuated by the baler for loosening the slotter units from the baled material.

14. In a baler, a baling chamber, means for binding bales of material in the chamber, said means including slotter units having part of their length insertable into the baling chamber to be baled into the compressed material, the remainder of said length projecting therefrom, an abutment supported from the baler in the path of travel of the projecting portion of said slotter units and positioned so as to be contacted by one of said portions of the length of said slotter units at the point of rearward travel thereof where it is desired that another slotter unit be inserted into the baling chamber, means for automatically inserting slotter units into said chamber and for automatically loosening them in the baled material, and a trip operable by said abutment for causing said inserting means to insert a slotter unit into said chamber, and said abutment being yieldable to pressure beyond that necessary for operating said trip to provide for the passage of slotters beyond said abutment.

15. In a baler, a chamber, means for binding bales of material in the chamber, said means including slotter units insertable into the baling chamber to be baled into and to move therealong with the material being baled in, and means for determining the time of insertion of said units including a rod slidable lengthwise of said baling chamber, a bracket adjustable on said chamber and in which said rod is slidable, abutment means on said rod engageable with said bracket to limit longitudinal movement of said rod in one direction, abutment means on said rod adapted to limit movement of said rod in the other direction, means urging said rod in a direction to yieldably maintain the last mentioned abutment means in contact with said bracket, and abutment means on the rod in position to be contacted by slotter units traveling with the compressed material for sliding said rod.

16. In a baler, a baling chamber, means for binding bales of material in the chamber, said means including slotter units insertable into the baling chamber to be baled into and to move therealong with the material being baled, a holder for the units, means for urging said holder in a direction to insert said slotters into said baling chamber, and means for determining the time of inserting of said units including a rod slidable lengthwise of said baling chamber, a bracket adjustable on said chamber and in which said rod is slidable, abutment means on said rod engageable with said bracket to limit longitudinal movement of said rod, means urging said rod in a direction to yieldably maintain said abutment means in contact with said bracket, abutment means on the rod in position to be contacted by slotter units traveling with the compressed material for sliding said rod, a latch positioned for retaining said holder prior to insertion of said slotter units, and a connection adjustable along said rod adapted to release said latch upon longitudinal movement of said rod.

17. In a baler, having a slotter member adapted to be inserted into the baling chamber to provide for binding the resulting bales, means for inserting the slotter, said means including a run-way extending outwardly from the baling chamber, a traveler guided for movement along said run-way and including a socket for receiving the slotter member, a spring tensioned cable connected for urging said traveler in a direction to insert the slotter member into said baling chamber, a latch on the traveler, a lever supported from the baler and positioned to engage the latch, a trip rod, an abutment adjustable along the trip rod and engaged with the lever, said trip rod being slidable longitudinally of said baling chamber, a bracket adjustably supported from said baling chamber and in which said rod is slidable, stop means for limiting sliding movement of said rod, and an abutment on said rod positioned to be contacted by a slotter unit baled in the compressed material and moving rearwardly therewith.

18. In a slotter inserter, a baling chamber, a runway extending outwardly from said baling chamber, an inserter unit adapted to run along said runway, a flexible element disposed for urging said inserter along said runway in a slotter inserting direction, and a spring extending transversely to said runway and connected to said inserter by said flexible element.

19. In a baler, the combination of a baling chamber, a plunger for compressing material in said chamber, and adapted for advancing and retracting movement, a slotter unit for insertion into the chamber for dividing material being baled and guiding a binding element into said material, holding means for so inserting said slotter unit and supporting it in position to be impelled against said plunger in its most advanced position, and a trip actuated by the baler for initiating inserting movement of said holding means in time to contact said plunger at its most advanced position, and means for continuing the inserting movement of said holder immediately upon retracting movement of said plunger.

20. In a baler, the combination of a baling chamber, a plunger for compressing material in said chamber, and adapted for advancing and retracting movement, a slotter unit for insertion into the chamber for dividing material being baled and guiding a binding element into said material, holding means for so inserting said slotter unit and supporting it in position to be impelled against said plunger in its most advanced position, and a trip actuated by the baler for initiating inserting movement of said holding means in time to contact said plunger at its most advanced position, means for continuing the inserting movement of said holder immediately upon retracting movement of said plunger, and means actuated by the baler for loosening said slotter unit from the baled material.

STANLEY D. RUSSELL.